(No Model.) 3 Sheets—Sheet 2.
S. W. BALCH.
MEANS FOR PROPELLING CANAL BOATS, &c.

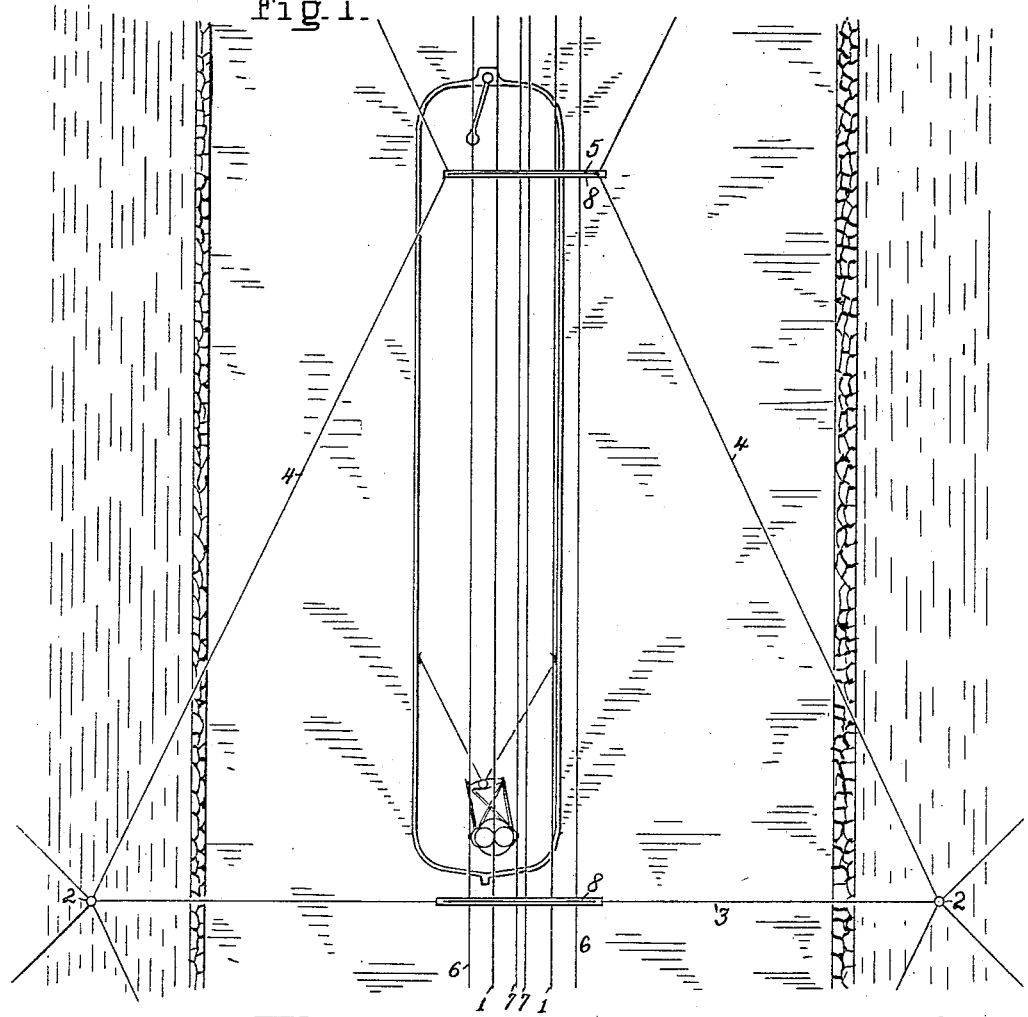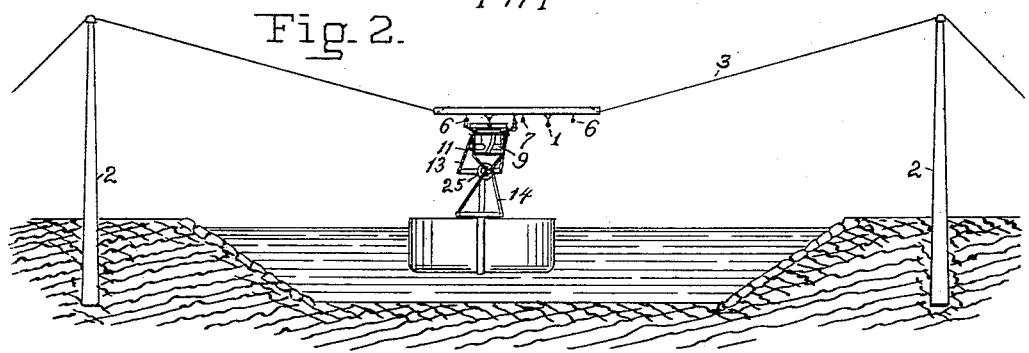

No. 569,400. Patented Oct. 13, 1896.

Witnesses:
Willard P. Shaw
Thomas Ewing Jr

Inventor,
Samuel W. Balch (No Model.) 3 Sheets—Sheet 3.

S. W. BALCH.
MEANS FOR PROPELLING CANAL BOATS, &c.

No. 569,400. Patented Oct. 13, 1896.

Witnesses:
Willard P. Shaw
Thomas Ewing Jr.

Inventor,
Samuel W. Balch

UNITED STATES PATENT OFFICE.

SAMUEL W. BALCH, OF YONKERS, NEW YORK.

MEANS FOR PROPELLING CANAL-BOATS, &c.

SPECIFICATION forming part of Letters Patent No. 569,400, dated October 13, 1896.

Application filed July 7, 1894. Serial No. 516,799. (No model.)

*To all whom it may concern:*

Be it known that I, SAMUEL W. BALCH, a citizen of the United States of America, residing at Yonkers, Westchester county, State of New York, have invented certain new and useful Improvements in Means for Propelling Canal-Boats and other Vehicles, of which the following is a specification.

The means which I employ are intended especially for the navigation of inland watercourses, such as canals and lakes, where the conditions favor its use, but they are also applicable to the propulsion of land-vehicles on roads over which the overhead system has been installed. They employ a stationary cable, which is suspended over the course intended for the vehicle, and as the proper support of this cable necessitates the stretching of span-wires or the provision of other suitable support from the ground these considerations largely determine the conditions under which my improvement is practicable. The cable acts as a rail or fixed way along which suitable mechanism travels, and in so doing exerts the requisite traction on the vehicle to effect its propulsion. In such means as have been heretofore proposed, wherein a fixed way is provided along the side or over the course, the traction mechanism has been supported wholly or in part by the way along which it travels. In my improvement the weight of this is supported wholly by the vehicle, and since none of its weight comes on the cable the latter requires only such support as may be necessary for its own weight and to enable it to withstand such horizontal strains as the traction mechanism will put upon it. In working out the details of this system in accordance with the foregoing conditions several novel features have been incorporated which are set forth in the claims. The specific arrangement and mechanism by which I preferably carry out these features is shown in the accompanying three sheets of drawings.

Figure 3:
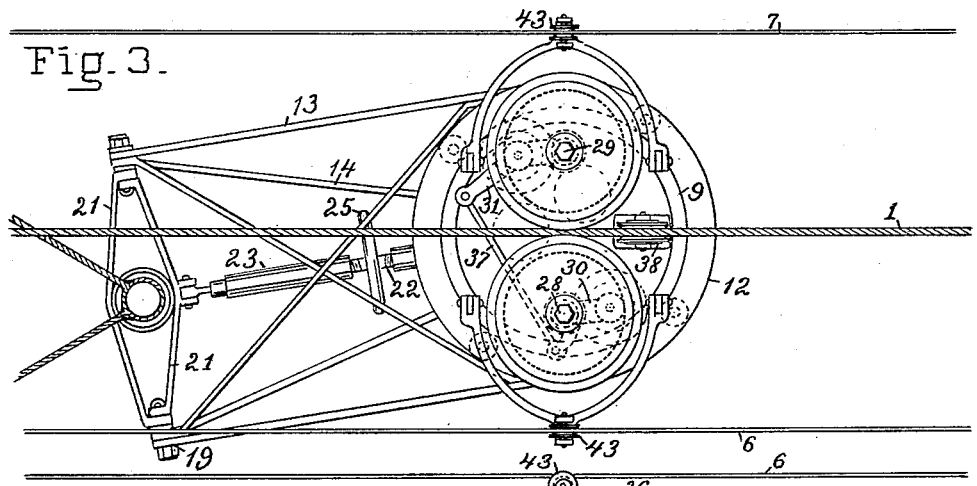
Figure 4:
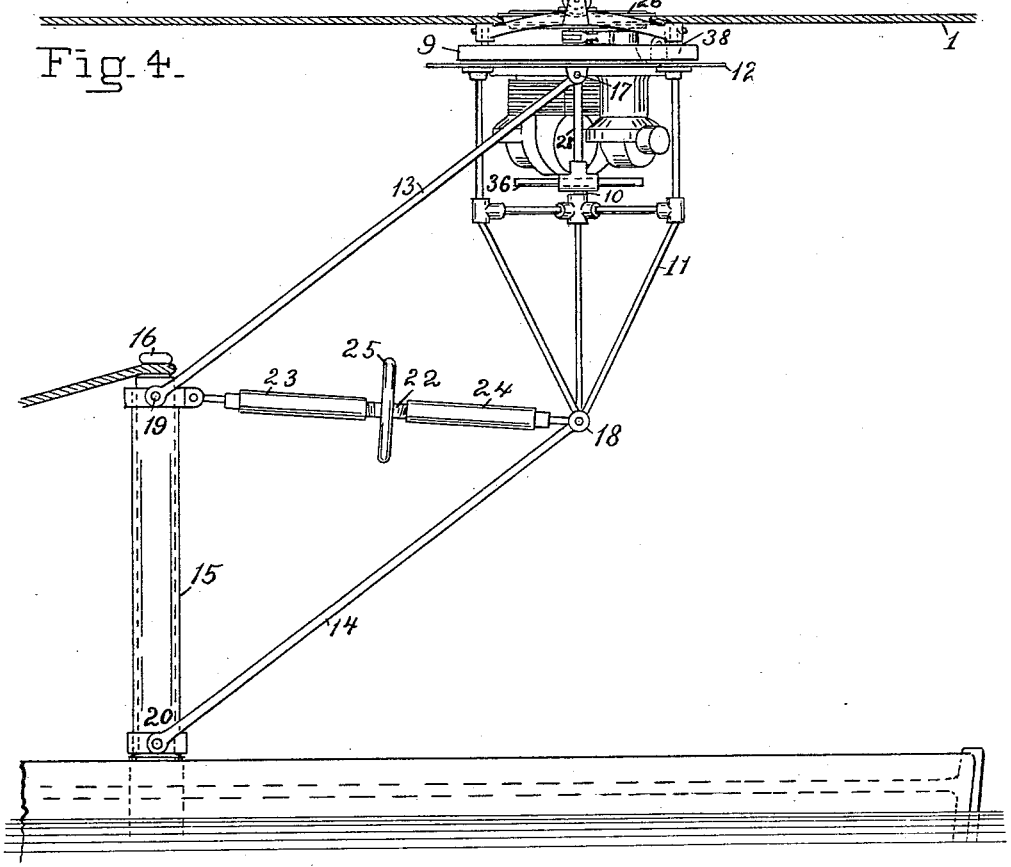
Figure 5:
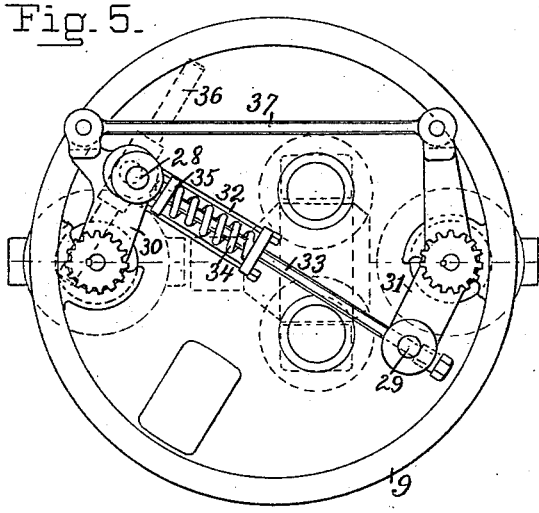
Figure 6:
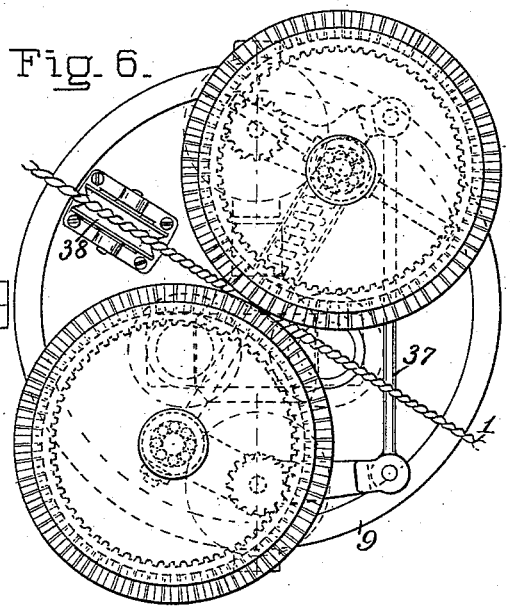
Figure 7:
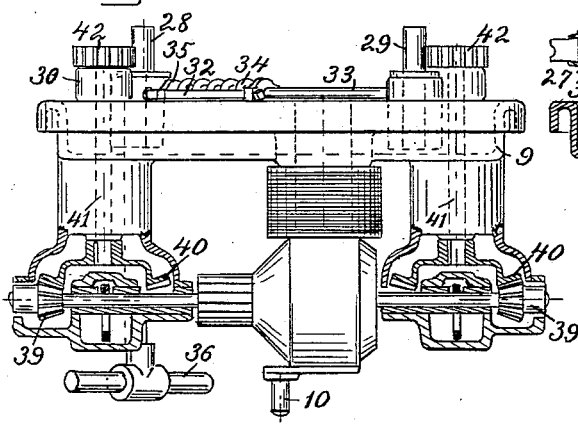
Figure 8:
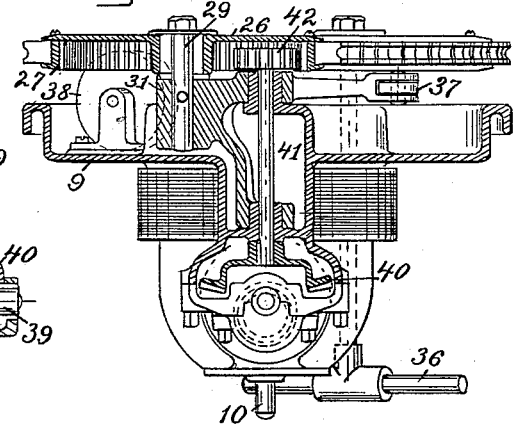

Figure 1 is a top or plan view of a waterway with my improvement. Fig. 2 shows my improvement in a transverse section across the waterway. Fig. 3 is a top view of the traction mechanism. Fig. 4 is a side view together with a portion of the boat on which it is mounted. Fig. 5 is a top view of a portion of my mechanism which carries the gripping-wheels, the wheels, however, being removed. This and the following figures are drawn to double the scales of the two preceding. Fig. 6 is a top view with the gripping-wheels in place. Fig. 7 is a projection from Fig. 5. Fig. 8 is a projection from Fig. 6, in which one of the gripping-wheels is shown in section and the framework is broken away.

The stationary cable 1 is preferably suspended over the watercourse, but the principal conditions governing its location are that it shall be as near to the course of the boat as is practicable and that at its points of suspension it shall be of a uniform height above the water. In Figs. 1 and 2 are shown two such cables for the convenience of simultaneous traffic in both directions. At suitable intervals along the banks of the watercourse are poles 2. Cross span-wires 3 are stretched between opposite poles for the support of the cables, and diagonal span-wires 4 are also provided which afford supports between the supports from the cross span-wires. The cables are thus supported with twice the frequency of the pairs of poles.

In supporting two parallel cables, as shown, instead of simply crossing the diagonal span-wires, one is led between poles on one side of the watercourse and the other between poles on the opposite side. The two are drawn together at their middle points by a short tie-wire 5. As I have shown an electric motor for actuating the traction mechanism, it is necessary to supply electricity to the motor. This is most conveniently accomplished by trolley-wires, and two of these, 6 7, are shown on either side of each of the cables, thus affording a metallic circuit. If it is desired to run the motor with bi or tri phase currents, the cable can be used as a third conductor. The trolley-wires, as well as the cables, are duplicated for traffic in both directions. In order that the two sets of wires may be both strung as near to the center of the watercourse as possible and to prevent any trouble from the accidental contacting of the contiguous wires 7 7, the currents on these will be of the same polarity and phase. For the suitable insulated support of the cables and trolley-wires strips of wood 8 are fastened to the under sides of the tie-wires and under the central sections of the cross span-wires. The insulator-supports for the conductors are set in these strips.

Since the strain of propelling the boats comes upon the suspended cable it has to be of sufficient strength for the purpose, but as the diagonal span-wires take off the strain at frequent intervals the strains due to but one or two boats can come on any one point of the cable in addition to the strains arising from its own weight. Its size should be sufficient to give the requisite surface for the gripping-wheels to properly take hold. Suitable hangers carry the cable where it passes under the span-wires. These hangers may be similar in design to such as are employed for the suspension of trolley-wires. Their proportions must be such, however, that they will offer as little obstruction as possible to the passage of the gripping-wheels.

The traction mechanism is carried by the boat. It consists of two gripping-wheels, together with means to drive them, and a suitable supporting-framework which maintains them in a horizontal plane, so that they will properly pass the cable-hangers. This framework is also so organized that it maintains the gripping-wheels at the required height and restrains them from shifting their position relative to the boat in the direction of its travel, but at the same time it leaves them free to turn about a common vertical axis to allow for any deviation of the boat with respect to the direction of the cable. The supporting-framework also permits the gripping-wheels to shift laterally, in order to give the boat more freedom of direction than if it were held to the precise course of the cable. This organization for angular and lateral adjustment is important, because the line of the cable when suspended over a sinuous watercourse will be an angular one, while it will be necessary to permit the boat to change its direction gradually. Its course, therefore, should coincide only approximately with that of the cable.

In order that the gripping-wheels may be free to adjust angularly and laterally with respect to the boat while their position and movement in other directions is restrained or controlled, the following construction has been devised: The wheels are mounted, as will be described later, on a gripping-wheel base 9. This is circular and has a pivot 10. It sets in a vertical frame, which is constructed of rods or tubes 11, joined together and surmounted by a ring 12. The ring guides the gripping-wheel base and the tubes support a bearing for the pivot, both having a common vertical axis, about which the wheel-base with the gripping-wheels turn freely to permit the latter to adjust themselves to the direction of the cable. The vertical frame is joined by braces 13 14 to a sleeve 15, which fits over a mast or post 16, framed in the boat. The sleeve can turn on the mast and so permit the gripping-wheels to be shifted from the central plane of the boat. It is only necessary that this adjustment should be a lateral one, but since it is most simply provided by the joint between the sleeve and mast the lateral adjustment is in a curved path. As this curvature, however, is not essential to the system I shall term the joint between the mast and sleeve a "lateral" joint, and the sleeve, braces, and vertical frame will be considered as constituting a laterally-movable frame.

Variations in the level of the water and in the load carried by the boat will alter from time to time the vertical distance between the deck and the cable, and on this account a vertical adjustment of the height of the gripping-wheels above the boat is necessary. In the construction shown this is provided in the laterally-movable frame. The two braces 13 14 are each hinged to the vertical frame at 17 18 and at 19 20 to arms 21, projecting from the sleeve. The axes of these hinges are all horizontal and parallel to each other, and they are also equidistant, the distance between 17 18 on the vertical frame equaling the distance between 19 20 on the arms of the sleeve, and the axes of the hinges 17 18 of the upper brace being the same distance apart as the distance between the hinges 18 20 of the lower brace. By this parallel-motion construction the vertical frame is maintained in the same vertical direction for all adjustments and the gripping-wheels maintained in a horizontal plane, so that they will properly pass the cable-hangers.

In addition to the two braces 13 14 there is also provided an extensible brace which is diagonal to them. It consists of a screw-shaft 22, threaded right hand on one end and left hand on the other, and two nuts. One of the nuts, 23, is hinged to the upper end of the sleeve, and the other, 24, to the lower end of the vertical frame. A hand-wheel 25 is fastened to the center of the screw-shaft and serves to turn it to shorten or lengthen the brace, and so shift or lower the gripping-wheels.

The gripping-wheels each consist of two metal parts, one part, 26, being the upper flange, web, and hub, and the other, 27, being the rim and lower flange. The two parts are fastened together with screws. They are separated to insert the material for the face which grips the cable. This consists of nearly square sections of leather and rubber, such as is used for belts and boot-heels. These are shaped to fit the space between the flanges of the wheels and the cable and are held in place by drawing the two parts of the wheels together with screws.

The gripping-wheels have roller-bearings to reduce the friction. They revolve about pins 28 29, which project vertically from brackets 30 31, which are hinged to the gripping-wheel base. The manner of hinging is shown in Fig. 8, which is a section through the hinge of one of them. The wheels are mounted on these hinged brackets instead of directly on the base, so that they can be brought together or separated to compensate for wear of their gripping-faces or to release the cable in an emergency.

The ends of the brackets which carry the pins for the gripping-wheels are connected by an extensible link. This consists of a strap 32, a rod 33, and a compression-spring 34, which is compressed between a head or cross-bar 35 on the end of the rod and the strap. This spring is of such a strength that it normally exerts the pressure required between the gripping-wheels. When the cable is between the wheels, the brackets are forced apart slightly, the cross-bar 35 is lifted away from the hub of the bracket 30, and the pressure of the spring is transmitted to the wheels. This permits the gripping-wheels to separate in passing any enlargement of the cable, as at the hangers, or any slight obstruction.

The pin 28, on which one of the gripping-wheels turns, is eccentric to its bearing in the hub of the hinged bracket. This is extended down through the hub and a handle 36 attached. By turning this the gripping-wheels are brought together to engage the cable.

One of the hinged brackets, 30, has a projection with an eye on the same side of its hinge as the hub for the pin 28, and the other, 31, has a projection with a similar eye on the opposite side of its hinge from the hub for its pin 29. These eyes are joined by a rigid link 37. By reason of this connection between the brackets they can move toward each other or away from each other only at the same time, and the point where the cable is engaged by the gripping-wheels is thus kept from shifting to one side of the axis of the vertical frame. As for economy of construction the cable will be hung only at intervals, and since it will sag slightly between the hangers it will not, at all points, be equidistant from the water. In consequence of this the height of the gripping-wheels will be adjusted to the cable at the hangers, and since the cable is lower at intermediate points it is lifted into line with the gripping-wheels. This is effected by a guide-wheel 38, carried by the gripping-wheel base.

Thus far in describing the mechanism carried by the boat nothing has been said about the motive power for the gripping-wheels. The character of this motive power and the means by which it is communicated to the gripping-wheels is immaterial to the novel features of the traction mechanism already described. In the drawings I have shown how the gripping-wheels can be revolved by means of an electric motor, and in order that the means for transmitting the power may be as direct as possible it is incorporated in the gripping-wheel base, the field-magnets of the motor serving also as its framework. The bearings for the armature-shaft are at the ends of downwardly-extending tubular hangers. The power from the armature-shaft is transmitted through bevel pinions and gears 39 40 to vertical shafts 41, which pass through the hinges of the hinged brackets. These have pinions 42 at their upper ends which engage with the internally-toothed rims of the gripping-wheels.

Two trolley-wheels engage the conductors on either side of the cable and take off the current for the motor. They are carried by the gripping-wheel base, but suitably insulated therefrom. If it is desired to use the cable as a third conductor, the guide-wheel can be used as its trolley-wheel. The water which supports the boat, it is to be noted, forms no part of the foregoing propelling mechanism, since it uses no screw, paddle-wheel, or other device acting on the water to effect the propulsion. The improvements are therefore applicable to the propulsion of vehicles irrespective of the character of their support, and whether they be canal-boats or road-wagons, both of which, together with kindred forms of conveyances, will be termed "vehicles." Furthermore, the parts of my invention shown in Figs. 5 to 8 are applicable in hoisting apparatus and for similar uses wherein the cable is the movable and the framework supporting the gripping-wheels the fixed element of the system.

Without limiting myself to the precise details shown, what I claim, and desire to secure by Letters Patent of the United States, is—

1. The combination with a vehicle, of a laterally-movable frame supported thereby, a gripping-wheel base supported by and vertically jointed to said frame, gripping-wheels horizontally mounted on said base substantially over said joint, actuating mechanism for the gripping-wheels, and a fixed way engaged by said wheels, substantially as described.

2. The combination with a vehicle, of a laterally-movable frame supported thereby, a gripping-wheel base supported by and vertically jointed to said frame, gripping-wheels horizontally mounted on said base substantially over said joint, actuating mechanism for the gripping-wheels, a fixed way engaged by said wheels, and means for vertically adjusting the gripping-wheels, substantially as described.

3. The combination with a vehicle, of a laterally-movable and vertically-adjustable frame supported thereby, a gripping-wheel base supported by and vertically jointed to said frame, gripping-wheels horizontally mounted on said base substantially over said joint, actuating mechanism for the gripping-wheels, and a fixed way engaged by said wheels, substantially as described.

4. The combination with a vehicle, of a mast, a frame laterally jointed thereto, a gripping-wheel base supported by and vertically jointed to said frame, gripping-wheels horizontally mounted on said base substantially over said joint, actuating mechanism for the gripping-wheels, and a fixed way engaged by said wheels, substantially as described.

5. The combination with a vehicle, of a mast, a sleeve carried thereby, a vertical frame, parallel braces hinged to both sleeve and frame, means for vertically adjusting the height of the frame relatively to that of the sleeve, a gripping-wheel base supported by and vertically jointed to said frame, gripping-wheels supported by said base, actuating mechanism for the gripping-wheels, and a fixed way engaged by said wheels, substantially as described.

6. The combination with two gripping-wheels, of a gripping-wheel base, brackets hinged to said base and carrying said gripping-wheels, one of said brackets having an eye on the same side of its hinge as its wheel and the other having an eye on the opposite side, a rigid link connecting said eyes, means for drawing said gripping-wheels together and means for revolving them, substantially as described.

7. The combination with a gripping-wheel base, of two gripping-wheels adjustable to and from each other, brackets carrying said wheels, a link attached between the brackets, a spring constructed to be strained by the extension of said link, means for separating the wheels and for bringing them together, and means for revolving them, substantially as described.

8. The combination with two gripping-wheels provided with gear-teeth, of a gripping-wheel base, brackets hinged to said base and carrying said gripping-wheels, shafts through the hinges of said brackets, pinions on the shafts which engage with the gripping-wheels, means for simultaneously revolving the shafts, and means for drawing the wheels together, substantially as described.

9. The combination with two gripping-wheels provided with gear-teeth, of a gripping-wheel base, brackets hinged to said base and carrying said gripping-wheels, shafts through the hinges of said brackets, a motor geared to said shafts, pinions on the shafts which engage with the gripping-wheels, and means for drawing the wheels together, substantially as described.

SAMUEL W. BALCH.

In presence of—
THOMAS EWING, Jr.,
WILLARD P. SHAW.